(12) United States Patent
Inoue et al.

(10) Patent No.: US 10,091,390 B2
(45) Date of Patent: Oct. 2, 2018

(54) IMAGE PROCESSING APPARATUS AND IMAGE PROCESSING METHOD FOR EXTRACTING FEATURE POINTS OF A DOCUMENT IMAGE

(71) Applicant: CANON KABUSHIKI KAISHA, Tokyo (JP)

(72) Inventors: Hirowo Inoue, Kawasaki (JP); Eiichi Takagi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/267,020

(22) Filed: Sep. 15, 2016

(65) Prior Publication Data

US 2017/0085746 A1    Mar. 23, 2017

(30) Foreign Application Priority Data

Sep. 17, 2015 (JP) .................. 2015-184524

(51) Int. Cl.
 *H04N 1/00* (2006.01)
 *H04N 1/387* (2006.01)
(52) U.S. Cl.
 CPC ....... *H04N 1/3873* (2013.01); *H04N 1/00809* (2013.01); *H04N 1/3876* (2013.01)
(58) Field of Classification Search
 None
 See application file for complete search history.

(56) References Cited

U.S. PATENT DOCUMENTS 5,802,217 A * 9/1998 Suzuki ............... H04N 1/40006
 358/461
2015/0288839 A1* 10/2015 Sohara ............... H04N 1/00819
 358/474

FOREIGN PATENT DOCUMENTS

JP          8-97980 A      4/1996
JP          2010-130634 A  6/2010

OTHER PUBLICATIONS

Barbara Zitová ; Jan Flusser1, Jaroslav Kautsky and Gabriele Peters, Feature point detection in multiframe images, Czech Pattern Recognition Workshop 2000, Tomáš Svoboda (Ed.), Peršlak, Czech Republic, Feb. 2-4, 2000, Czech Pattern Recognition Society.*

* cited by examiner

*Primary Examiner* — Barbara Reiner
(74) *Attorney, Agent, or Firm* — Canon U.S.A., Inc. IP Division

(57) ABSTRACT

An image processing apparatus obtains image data of a document image and extracts a plurality of feature points of the document image. The image processing apparatus obtains a skew angle of the document image with respect to a predetermined direction and an assembling angle of an image obtaining unit with respect to a predetermined assembling direction from a coordinate correspondence relationship between coordinates of a plurality of feature points of a registered document image registered in advance and coordinates of the plurality of extracted feature points of the document image.

17 Claims, 8 Drawing Sheets

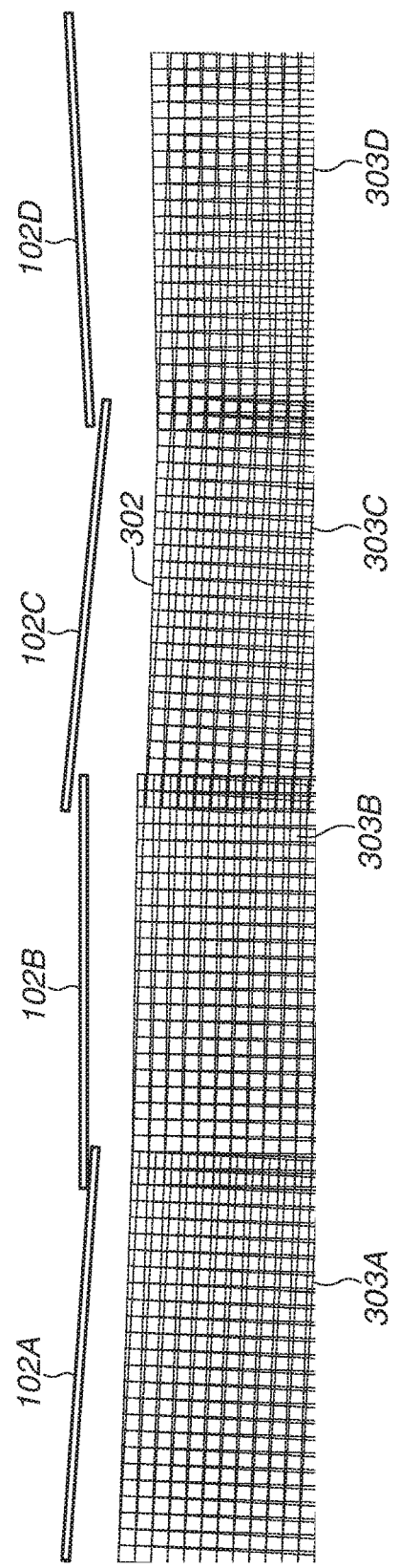

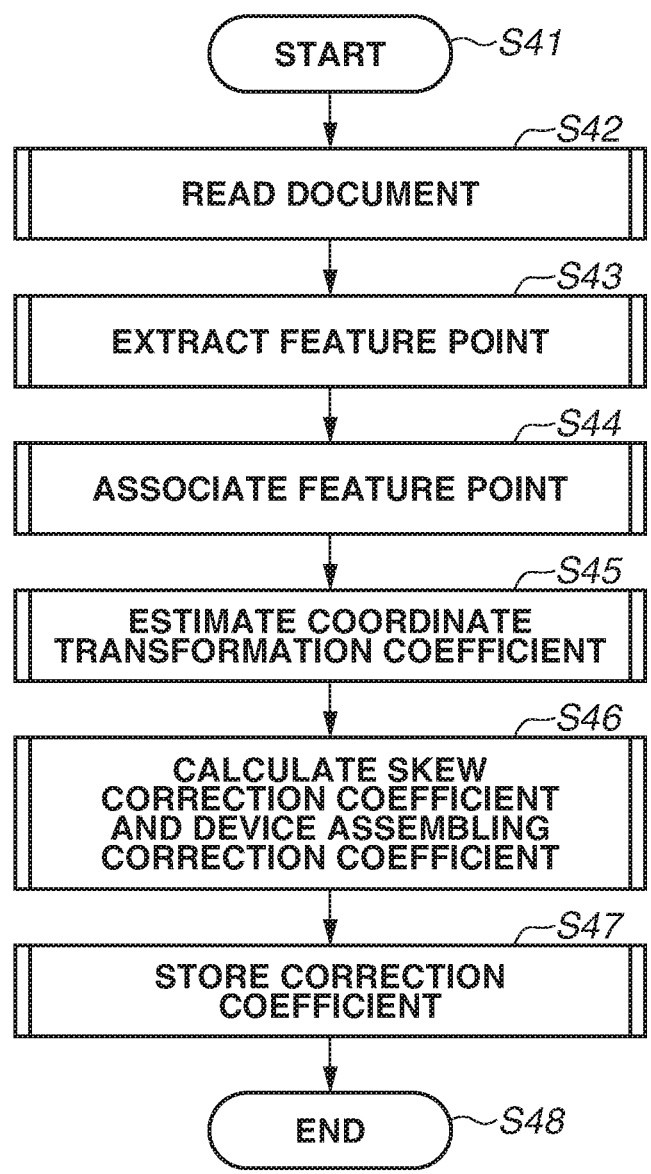

IMAGE PROCESSING APPARATUS AND IMAGE PROCESSING METHOD FOR EXTRACTING FEATURE POINTS OF A DOCUMENT IMAGE

BACKGROUND OF THE INVENTION

Field of the Invention

Aspects of the present invention relates to an image processing apparatus and an image processing method.

Description of the Related Art

Conventionally, processing using an optical character reader (OCR) has been performed as processing for detecting an orientation of a document image read by a scanner with respect to a normal direction.

Japanese Patent Application Laid-Open No. 2010-130634 describes an apparatus which determines, when a sensor device such as a scanner reads a document image, how the document image is inclined (skewed) with respect to the normal direction. The apparatus described in Japanese Patent Application Laid-Open No. 2010-130634 determines a skew angle of the document image (the read image) with respect to a registered image similar to the document image based on coordinates of feature points of the document image and coordinates of feature points of the registered image.

Japanese Patent Application Laid-Open No. 8-97980 describes an apparatus which corrects and resolves displacement in a document feeding direction (a sub-scanning direction) caused in a read image when a plurality of reading sensors (sensor devices) for reading a document is disposed with each inclination.

The apparatus described in Japanese Patent Application Laid-Open No. 2010-130634 can detect skew of a document (a skew angle of the document placed inclinedly) with respect to the sensor device. However, as a premise for that, the sensor device is to be accurately (vertically) placed with respect to a reading platen or a sheet passing path of the document. In other words, the apparatus described in Japanese Patent Application Laid-Open No. 2010-130634 cannot accurately detect the skew of the document with respect to the sensor device when the sensor device is not placed vertically to the sheet passing path of the document. The technique discussed in Japanese Patent Application Laid-Open No. 2010-130634 is a technique which is established on the premise that an assembling angle of the sensor device is maintained at a desired angle.

The apparatus described in Japanese Patent Application Laid-Open No. 8-97980 can correct the displacement in the sub-scanning direction, however, there is no teaching of correcting the assembling angle of the sensor device. In other words, the apparatus described in Japanese Patent Application Laid-Open No. 8-97980 cannot perfectly correct reading resolution in a main scanning direction. The assembling angle of the sensor device is corrected by rotation coordinate transformation, however, there is no description of the rotation coordinate transformation in Japanese Patent Application Laid-Open No. 8-97980. The apparatus described in Japanese Patent Application Laid-Open No. 8-97980 cannot correct the reading resolution in the main scanning direction and cannot obtain an accurate read image.

In the case of a large-sized scanner capable of reading a sheet exceeding an A3 sheet size, a plurality of sensor devices may be bonded with each other and used. Regarding the large-sized scanner, if linearity of the individual sensor device can be guaranteed, the fact that the plurality of the sensor devices is assembled perfectly in parallel and vertical to the sheet passing path of the document cannot be guaranteed in some cases. Especially, regarding the large-sized scanner, because of its large size, the assembling angle of the sensor device may be changed due to a secular change, an environmental temperature change, an installation condition such as sunshine, and a use condition. Therefore, even if the plurality of the sensor devices is assembled accurately to an angle (vertical) at the time of shipment from the factory, the assembling angle may be changed in the subsequent use. In such a case, an accurate read image cannot be obtained just by detecting the skew angle of the document. In order to obtain an accurate read image, an assembling angle of each of the plurality of the sensor devices in addition to detection of the skew angle of the document is detected.

SUMMARY OF THE INVENTION

According to an aspect of the present invention, an image processing apparatus includes an image obtaining unit configured to obtain image data of a document image, an extraction unit configured to extract a plurality of feature points of the document image, an association unit configured to associate coordinates of a plurality of feature points of a registered document image registered in advance with coordinates of the plurality of extracted feature points of the document image, a correspondence relationship obtaining unit configured to obtain a coordinate correspondence relationship between the coordinates of the plurality of feature points of the registered document image and the coordinates of the plurality of feature points of the obtained document image which are associated with each other, and an angle obtaining unit configured to obtain a skew angle of the document image with respect to a predetermined direction and an assembling angle of the image obtaining unit with respect to a predetermined assembling direction using the obtained coordinate correspondence relationship.

Further features of aspects of the present invention will become apparent from the following description of exemplary embodiments with reference to the attached drawings.

BRIEF DESCRIPTION OF THE DRAWINGS

FIG. 3 illustrates an example of a read image when an assembling angle is different for each sensor device.

FIG. 4 illustrates procedures of correction coefficient calculation processing.

DESCRIPTION OF THE EMBODIMENTS

Various exemplary embodiments for implementing the present invention are described in detail below with reference to the attached drawings. The exemplary embodiments described below are examples of measures realizing aspects of the present invention and are to be appropriately modified or altered depending on a configuration of an apparatus to which aspects of the present invention are applied or various conditions, and aspects of the present invention are not limited to the below-described exemplary embodiments.
(Configuration of Image Processing Apparatus)

Figure 1:
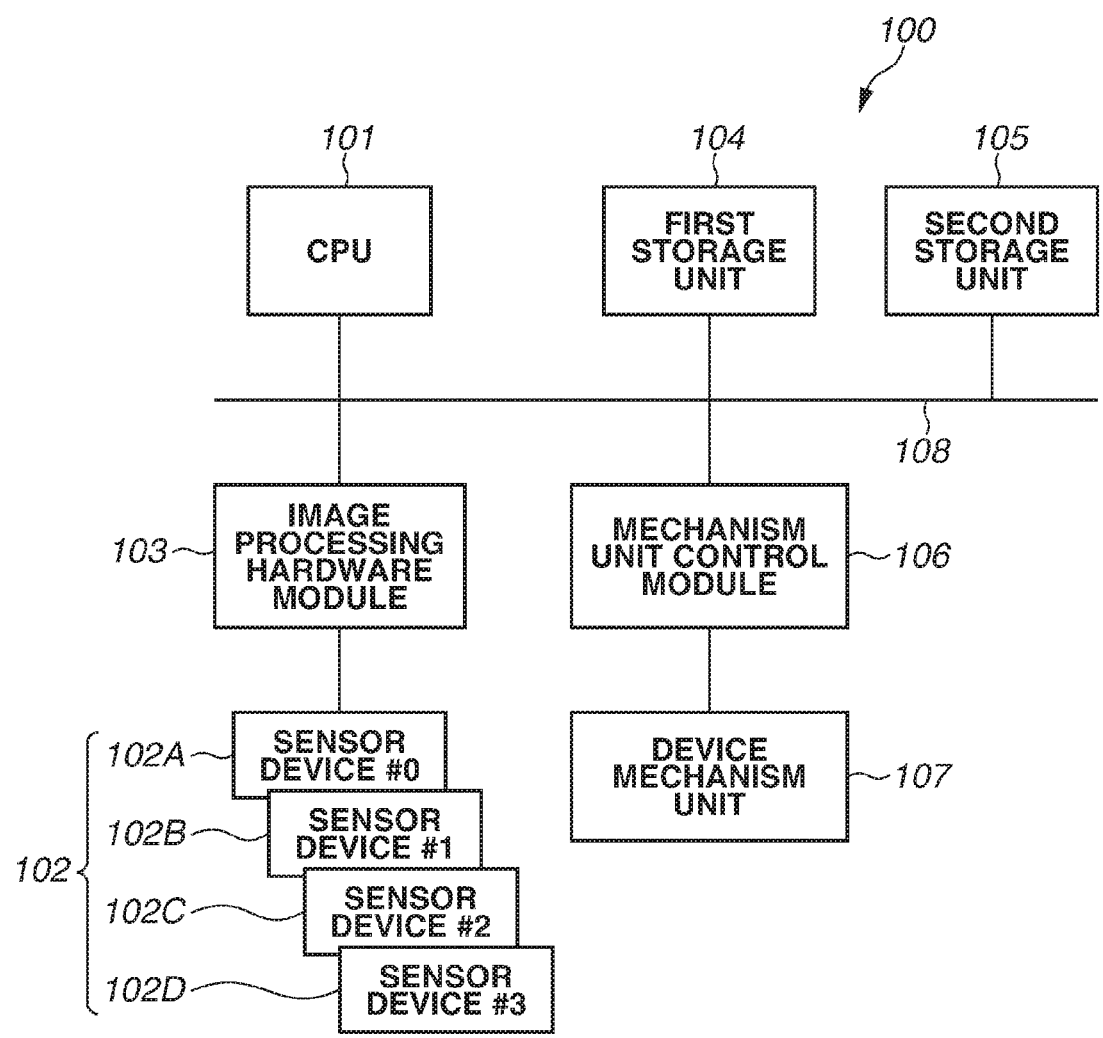
FIG. 1 illustrates a schematic configuration of an image processing apparatus according to an exemplary embodiment of the present invention.

FIG. 1 illustrates a schematic configuration of an image processing apparatus 100 according to a first exemplary embodiment of the present invention.

The image processing apparatus 100 includes a central processing unit (CPU) 101, a sensor device group 102, an image processing hardware module 103, a first storage unit 104, a second storage unit 105, a mechanism unit control module 106, and a device mechanism unit 107. Each unit of the image processing apparatus 100 is connected with each other via a bus 108. The image processing apparatus 100 is a large-sized scanner capable of reading a sheet (a document) exceeding, for example, an A3 sheet size by the sensor device group 102.

The CPU 101 comprehensively control operations of the image processing apparatus 100 and performs image processing, arithmetic processing, determination processing, and the like according to the present exemplary embodiment. The CPU 101 may perform other image processing and the like. In addition, a CPU installed in a different apparatus or a system may be used as the CPU 101 in FIG. 1.

The sensor device group 102 includes a first sensor device 102A, a second sensor device 102B, a third sensor device 102C, and a fourth sensor device 102D. A sign #0 attached to the first sensor device 102A in FIG. 1 represents that a sensor device number of the first sensor device 102A is zero. Signs #1, #2, and #3 also represent that the sensor device numbers are one, two, and three. The sensor devices 102A to 102D scan and read a document and thus can be referred to as scanner devices. The sensor devices 102A to 102D obtain image data of a document image.

The image processing hardware module 103 receives image signals (image data) read by a plurality of the sensor devices 102A to 102D. The image processing hardware module 103 according to the present exemplary embodiment includes, for example, a sensor device driver module such as an analog front end (AFE) and an image correction hardware module. The image processing hardware module 103 may be referred to as a scanner image processing module.

The first storage unit 104 is a readable and writable storage unit such as a random access memory (RAM) for maintaining (storing) the read image data according to the present exemplary embodiment. It can be said that the first storage unit 104 includes an image memory since it stores the read image data. The read image data may be simply referred to as "read image" in the following description.

The first storage unit 104 may store a processing procedure described in the present exemplary embodiment as a program. In the first storage unit 104, a registered document image to be compared with a read image is stored (registered) in advance. Especially, according to the present exemplary embodiment, coordinates of a plurality of feature points of the registered document image are registered in the first storage unit 104. The coordinates of the feature point registered in advance in the first storage unit 104 may be referred to as registered coordinates.

The second storage unit 105 is a read-only memory (ROM), a hard disk, or the like for maintaining (storing) a program of the processing procedure, reference image data or reference coordinate data for determination, and the like described in the present exemplary embodiment.

The mechanism unit control module 106 controls a motor (or a motor driver) for driving the sensor devices 102A to 102D, a sheet feeding mechanism (not illustrated), and the like. The mechanism unit control module 106 also controls a light source (not illustrated) and the like installed in the image processing apparatus 100. The mechanism unit control module 106 operates the sensor devices 102A to 102D, a driving motor of the sheet feeding mechanism, the light source, and the like in response to reception of an instruction from the CPU 101 and the like.

The device mechanism unit 107 includes mechanism units (controlled units) such as the sensor devices 102A to 102, the driving motor of the sheet feeding mechanism, and the light source which are controlled by the mechanism unit control module 106.

The bus 108 connects constituent elements (components) of the above-described image processing apparatus 100 with each other and enables data exchange therebetween.
(Distortion of Read Image)

FIGS. 2A to 2D illustrate how a read image is distorted if an assembling angle of the sensor device (hereinbelow, referred to as a "device assembling angle" in some cases) is shifted when a sheet (a document) is read in a skewed state.

Figure 2A:
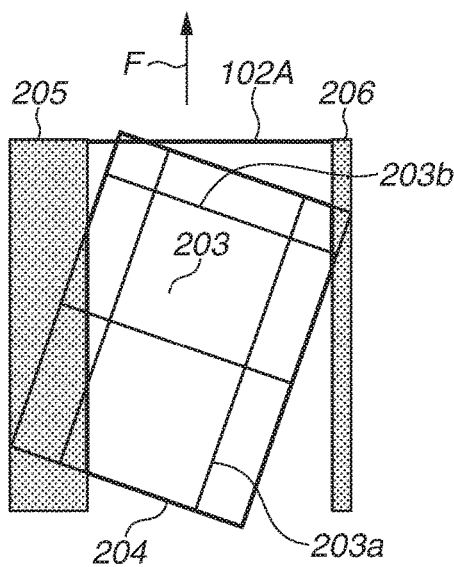
FIGS. 2A to 2D illustrate distortion of a read image due to a shift of an assembling angle of a sensor device.

FIG. 2A illustrates a document 203 and a read image 204 when the sensor device 102A is accurately (vertically) assembled with respect to an original document feeding direction F (indicated by an arrow in the drawing). In the present specification, when the sensor device is assembled vertically to the document feeding direction F as illustrated in FIG. 2A, it is described that the assembling angle of the sensor device 102A is not shifted. Hatching portions 205 and 206 in FIG. 2A represent parts (unreadable areas) in which reading cannot be performed since the document 203 is read in the skewed state. In the document 203, a vertical ruled line 203a and a horizontal ruled line 203b are ruled. In the present specification, an angle of the document 203 to the document feeding direction F is referred to as a skew angle. The skew angle can be said as an angle of the document image with respect to a predetermined direction.

Figure 2B:
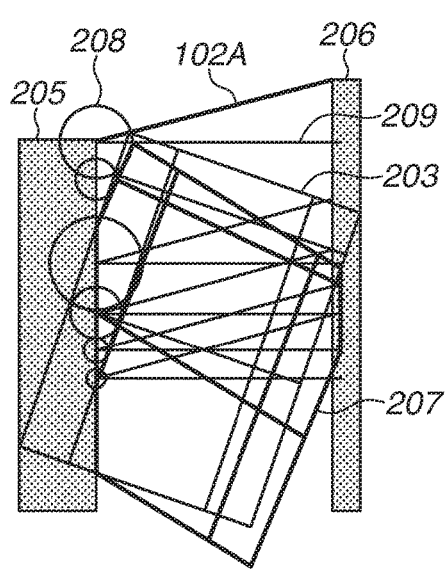

FIG. 2B illustrates the document 203 and a read image 207 when the sensor device 102A is assembled inclinedly with respect to the original document feeding direction F. In the present specification, when the sensor device 102A is assembled inclinedly with respect to the document feeding direction F as illustrated in FIG. 2B, it is described that the assembling angle of the sensor device 102A is shifted, or the sensor device is inclinedly assembled. A line 209 indicates a position where the sensor device 102A should be originally placed (the position of the sensor device 102A in FIG. 2A is indicated). In other words, the line 209 indicates a predetermined assembling direction with respect to the sensor device 102A. The assembling angle of the sensor device 102A is based on the line 209. The document feeding direction F may be referred to as a sheet passing direction because it is a direction that a sheet passes through the sensor device 102A.

Figure 2C:
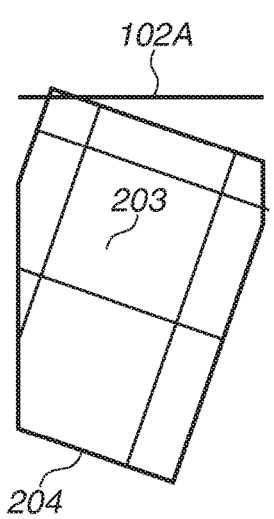

FIG. 2C illustrates the read image 204 same as that in FIG. 2A and only the sensor device 102A and the read image 204 are extracted from FIG. 2A. The read image 204 is an image free from distortion.

Figure 2D:
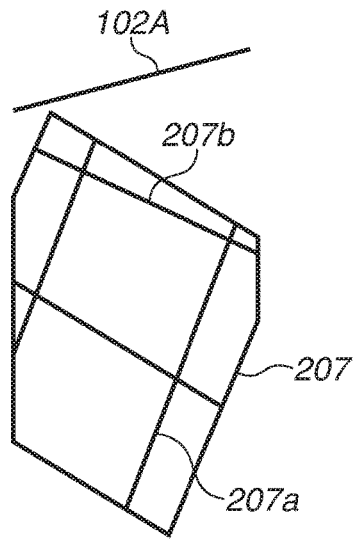

FIG. 2D illustrates the read image 207 same as that in FIG. 2B and only the sensor device 102A and the read image 207 are extracted from FIG. 2B. The read image 207 is an image including distortion. The distortion is caused by the shift of the assembling angle of the sensor device 102A. In other words, when the sensor device is inclinedly assembled, the document 203 (the read image 207) is read with the distortion according to the assembling angle of the sensor device 102A in addition to the skew angle.

A circle 208 illustrated in FIG. 2B is an auxiliary line for mapping, when a vertex on the document 203 appears on the sensor device 102A, the vertex onto a position at which the vertex would be read if the sensor device 102A is not inclined. The circle 208 on an upper left of FIG. 2B indicates when an upper left corner of the document 203 appears on the sensor device 102A inclinedly assembled.

The image processing hardware module 103 performs image processing assuming that the sensor device 102A is not inclined. Thus, in the case of FIG. 2B, the sensor device 102A reads the document 203 as if the document 203 is on the line 209 indicating the original assembling state vertical to the document feeding direction F.

Accordingly, the upper left angle of the document 203 is read as if placed on not an original position but a position at an equal distance on the line 209 viewed from a left end of the sensor device 102A (i.e., the origin of the read image when a scanning direction of the sensor device is from left to right). The read image is stored in the first storage unit (the image memory) 104.

The similar thing occurs at all points of the document 203. In other words, a rectangle shape of the document 203 and the ruled lines 203a and 203b on the document 203 which inclinedly passes through the sensor device 102A inclinedly assembled are read in a distorted way as indicated by thick lines 207, 207a, and 207b in FIG. 2D.

FIG. 3 is an example of read images (images including distortion) obtained when a grid-like document 302 is read by the sensor devices 102A to 102D (the sensor device group 102) of which the device assembling angles are shifted as described above. In FIG. 3, the assembling angles are different for each of the sensor devices 102A to 102D. Read image 303A to 303D respectively obtained by the four sensor devices 102A to 102D have individual distortion according to inclination of the respective sensor devices, and thus the read image 303A to 303D are read at different angles and different distortion as illustrated in FIG. 3. In other words, the document 302 is originally one image, however, four discontinuous (not smoothly connected) read images are generated by reading.

According to the present exemplary embodiment, when one document is read by the four sensor devices, one read image (four continuous read images) can be generated. For example, a position of each intersection point of a grid in the grid-like document 302 is extracted from the read image of the document. The document is, for example, a calibration sheet. Subsequently, the extracted intersection position (coordinates) is compared with a grid-like intersection position on the registered document image (an image of an original calibration sheet) stored in advance. Many extracted points (for example, 100 or more extracted points) are used as the intersection points. The comparison is performed on the many extracted points, and statistical processing is executed. A coordinate transformation coefficient is calculated by the statistical processing, and the skew angle of the document and the assembling angle of the sensor device are calculated at the same time (calculated in one processing) using the coordinate transformation coefficient.

The grid is described above as an example, however, another pattern having a specific rule in a positional relationship with peripheral points may be used without limiting to the grid as long as the rule is constant.

(Coordinate Transformation Coefficient)

Equations 1 and 2 are transformation equations used in distortion calculation according to the present exemplary embodiment. Based on the equations 1 and 2, separation of correction coefficients in coordinate transformation equations of the skew of the document and the sensor device assembling angle is described.

[Formula 1]

$$\begin{bmatrix} X \\ Y \end{bmatrix} = \begin{bmatrix} \alpha & \beta \\ \gamma & \delta \end{bmatrix} \begin{bmatrix} x \\ y \end{bmatrix} \quad \text{Equation 1}$$

$$\begin{bmatrix} \alpha & \beta \\ \gamma & \delta \end{bmatrix} = \begin{bmatrix} a & -b \\ b & a \end{bmatrix} \begin{bmatrix} c & 0 \\ d & 1 \end{bmatrix} \quad \text{Equation 2}$$

According to the present exemplary embodiment, each of the sensor devices 102A to 102D is assumed as a straight line, and regarding the skew of the document, it is assumed that the document is read at a constant skewed angle which is not changed temporally. Thus, distortion as a detection target according to the present exemplary embodiment is a combination (composition) of primary (linear) coordinate rotation transformations.

Actually, when the sensor device unit (the sensor device group) is divided into a plurality of the sensor devices in the large-sized scanner, it can be assumed that a curve of the individual sensor device will become negligibly small. The assumption can be practically applied to a case that a scanner (not large-sized scanner) provided with a conventional single sensor device scans a sheet of an A3 size or smaller.

In addition, regarding the skew of the document, a skew amount of the document in sheet feeding when the document passes through a print unit is extremely small compared with an amount of the document being inclinedly inserted by a user when a sheet (a document) pickup or a sheet end is set. Thus, a non-linear coordinate transformation term in which a document skew angle changes in a time series can be ignored in a practical level.

Composition of such primary coordinate rotation transformation can be expressed by the primary coordinate transformation equation shown in the equation 1. According to the present exemplary embodiment, in order to mainly describe obtainment of the assembling angle of the sensor device and the document skew angle, a constant term for adding an offset vector to a primary transformation matrix is omitted. The left-hand side of the equation 1 is XY coordinates when the sensor device is not inclined, and xy on the right-hand side is xy coordinates of an image read by the inclined sensor device. $\alpha$, $\beta$, $\gamma$ and $\delta$ are coefficient portions (coordinate transformation coefficients).

The coefficient portions of the equation 1 is constituted of multiplication of a coordinate rotation transformation matrix according to the skew of the document and a coordinate rotation transformation matrix according to the device assembling angle. Thus, the coefficient portions of the equation 1 can be replaced with an equation in which two transformation matrices are arranged in series as shown in the equation 2.

In this regard, correction terms regarding skew (skew correction terms) are a matrix including four normal independent terms since the entire document is rotated. Further, in correction terms regarding the assembling angle of the sensor device (a device assembling angle correction term), terms on the y coordinate in the input coordinates are 0 and 1 since the sheet performs linear motion without rotating with respect to the sheet passing direction of the document, namely the sub-scanning direction. In other words, the terms on the y coordinate can be simplified. A matrix of c, 0, d, and 1 in the equation 2 is a matrix of the assembling correction coefficients of the sensor device.

Further, from a known coordinate rotation formula, correction coefficients regarding the skew (skew correction coefficients) are $\cos\theta$, $-\sin\theta$, $\sin\theta$, and $\cos\theta$, so that only two values (a and b) are used as absolute values. Thus, the skew correction coefficients can be expressed in a, −b, b, and a as shown in the equation 2. As can be understood from the equation 2, the skew correction coefficients (a, −b, b, a) and the assembling correction coefficients (c, 0, d, 1) are separated.

The coefficients $\alpha$, $\beta$, $\gamma$, and $\delta$ of the equation 1 are calculated as follows. According to the present exemplary embodiment, first, a calibration sheet (FIGS. 5A and 5B) on which a specific pattern is printed is input at an arbitrary skew angle and read by the sensor devices 102A to 102D which are inclined at arbitrary angles according to correction coefficient calculation processing (FIG. 4) described below. Subsequently, a coordinate group of a plurality of feature points is extracted from the read images read by each of the sensor devices 102A to 102D. The statistical processing is performed on each sensor device so as to minimize an error between a result of transformation by the equation 1 performed on each coordinate in the coordinate group and a correct coordinate position which is stored in advance and corresponds to the coordinate. In the statistical processing, for example, the least square error method is used. The coefficients $\alpha$, $\beta$, $\gamma$, and $\delta$ are estimated (calculated) by the equation 1. The correct coordinates (position) is stored in, for example, the first storage unit 104. The correct coordinates (position) are the coordinates (position) of the feature point of the registered document image.

According to the present exemplary embodiment, the skew correction coefficients a and b of the sensor device 102A are used as the skew correction coefficients of all the sensor devices 102A to 102D on the assumption that the document (the calibration sheet) has no distortion, deflection, and the like.

The coefficients $\alpha$, $\beta$, $\gamma$, and $\delta$ are expressed as the following equations 3 from the skew correction coefficients a, −b, b, and a and the device assembling correction coefficients c, 0, d, and 1 in the equation 2.

$$\alpha = ac - bd$$
$$\beta = -b$$
$$\gamma = bc + ad$$
$$\delta = a \qquad \text{(equation 3)}$$

The coefficients b and a can be calculated from the coefficients $\gamma$ and $\delta$ calculated as described above. Further, the coefficients c and d can be calculated from the coefficients $\alpha$, $\beta$, a, and b.

When the above-described simple and trivial equations 3 are used, the skew angle of the document and the assembling angle of the sensor device can be uniquely calculated by performing the above-described calculation after the statistical processing on a plurality of extracted feature points and target coordinates (registered coordinates) which are stored in advance and correspond to each of the relevant feature points. As described above, according to the present exemplary embodiment, the skew angle of the document image and the assembling angle of each sensor device can be obtained at the same time.

(Correction Coefficient Calculation Processing)

FIG. 4 is a flowchart illustrating procedures of the correction coefficient calculation processing according to the present exemplary embodiment. Each processing in the flowchart in FIG. 4 can be performed by the CPU 101 reading and executing a predetermined program from the second storage unit 105. In the following description, a case is described in which the sensor device group 102, the image processing hardware module 103, and the first storage unit 104 illustrated in FIG. 1 perform each processing under the control by the CPU 101.

In step S41, the image processing hardware module 103 starts the correction coefficient calculation processing. In step S42, the sensor device group 102 reads a document.

In step S43, the image processing hardware module 103 extracts a plurality of feature points from the read image.

In step S44, the image processing hardware module 103 associates the position coordinates of the feature points of the registered document image stored (registered) in advance in the first storage unit 104 with the position coordinates of the feature points extracted from the read image. By associating the position coordinates of the feature points registered in the first storage unit 104 with the position coordinates of the extracted feature points, a coordinate correspondence relationship between coordinates of the plurality of feature points of the registered document image registered in advance and coordinates of the plurality of feature points of the extracted document image can be obtained.

In step S45, the image processing hardware module 103 performs the statistical processing on pairs of the feature points registered in advance and all of the extracted feature points to estimate the coordinate transformation coefficients $\alpha$, $\beta$, $\gamma$, and $\delta$ and thus calculates the coordinate transformation coefficients $\alpha$, $\beta$, $\gamma$, and $\delta$. In other words, the image processing hardware module 103 estimates the coordinate transformation coefficients $\alpha$, $\beta$, $\gamma$, and $\delta$ based on differences between the plurality of registered feature points and the plurality of extracted feature points and calculates the coordinate transformation coefficients $\alpha$, $\beta$, $\gamma$, and $\delta$.

In step S46, the image processing hardware module 103 calculates the skew correction coefficients a and b and the device assembling angle correction coefficients c and d using the method described by the equation 1 and the equation 2. In step S47, the first storage unit 104 records (stores) each of the correction coefficients.

In step S48, the CPU 101 terminates the correction coefficient calculation processing.

(Calibration Sheet)

Figure 5A:
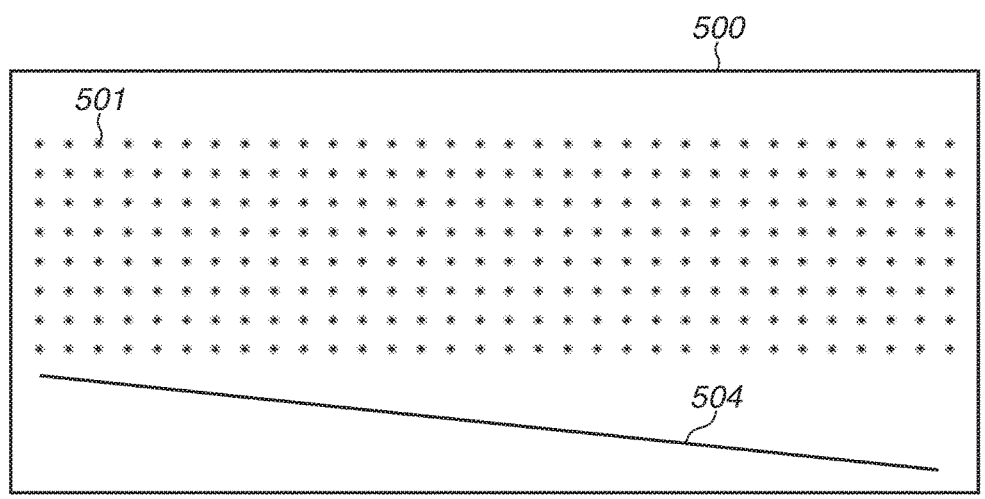
FIGS. 5A and 5B illustrates an example of an image for calibration.
Figure 5B:
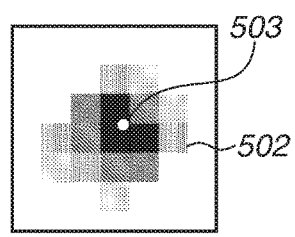

FIGS. 5A and 5B illustrate examples of a document image (a calibration image) 500 of a calibration sheet.

FIG. 5A is a top view of dots 501 arranged in a grid in the calibration image 500. A plurality of points (dots) 501 is regularly arranged on the calibration image 500 at preliminarily determined specific intervals. The dots 501 are thus arranged, and a target coordinate value can be easily stored. As illustrated in FIG. 5A, when the dots 501 are orderly arranged in a horizontal direction and a vertical direction of the calibration image 500, a target coordinate position can be calculated from coefficients of intervals of the dots 501 in the horizontal direction and intervals of the dots 501 in the vertical direction. Thus, a data amount of coordinate points to be recorded in advance is very small amount.

When the skew angle of the document image and the assembling angle of the sensor device are calculated, a relative positional relationship between the dots 501 is to be used. Thus, it is not necessarily required to record particularly where a first dot (for example, an upper left dot) 501 is placed on an absolute position on a sheet surface of the calibration sheet.

(Extraction of Feature Point)

FIG. 5B is an enlarged view of an extracted feature point 502. The feature point 502 has a center point 503.

A method for estimating the center point 503 is described. First, a predetermined area to be used as a feature point is regarded as the feature point 502 which is dominantly large with respect to the reading resolution. When the large feature point 502 is used, a blur and a phase difference in the reading can be corrected by a relatively simple method for, for example, obtaining a density centroid, and the center point 503 of the feature point 502 can be estimated. The center point 503 will be coordinates of the feature point 502.

However, this method is to remove an effect of a shape of the feature point 502 and an optical distortion of the sensor device by estimation and cannot guarantee that the position (coordinates) of the center point 503 is calculated with high accuracy. Generally, it is premised on that the position of the center point 503 obtained by this method includes an error.

Especially, when the assembling angle of the sensor device is shifted from a set angle, the shape of the feature point 502 and a reading position of the feature point 502 are not orderly arranged on certain horizontal and vertical coordinates and not placed on integer positions of the reading resolution, and the displacement after the decimal point is caused. Further, when skew of the document is added, and various types of displacement are caused. Thus, the displacement of the reading position is added to the above-described blur and phase difference in the reading, and accordingly, it is premised on that an error is included in (added to) measurement (estimation) of a center point 503 of each feature point 502.

According to the present exemplary embodiment, a plurality of the feature points is extracted in step S43 in FIG. 4 on the premise that an estimation error of such a dot center point is randomly caused. For example, in step S43, 100 or more feature points are extracted. Extraction of the plurality of (a predetermined number of) feature points is one of the features of the present exemplary embodiment and thus is described in comparison with Japanese Patent Application Laid-Open No. 2010-130634. According to Japanese Patent Application Laid-Open No. 2010-130634, a positional relationship of each extracted point is used as the feature point, however, a technique for correcting a positional extraction error in observation of the individual feature point is not described. In contrast, the present exemplary embodiment has a configuration in which, for example, 100 or more feature points are extracted, and a random error included in position extraction of each feature point is offset by a statistical method for calculating a minimum of a total sum of the square errors in comparison with a plurality of target points. As the more feature points are arranged (as the more feature points are extracted), the effect of the error including a measurement error of the position of the feature point (or a center point thereof) can be reduced, and the accuracy can be improved.

A diagonal line 504 in FIG. 5A is a calibration image used for detecting displacement other than the assembling angle of the sensor device. The calibration image (the diagonal line 504) is described below with reference to FIGS. 6A to 6C.

(Detection and Correction of Displacement)

The image processing apparatus 100 according to the present exemplary embodiment can detect (obtain) the skew angle of the document and the assembling angle of the sensor device and also detect displacement. The displacement is a shift (a deviation from a correct position) of a read image in the horizontal direction (the main scanning direction) and the vertical direction (the sub-scanning direction).

Figure 6A:
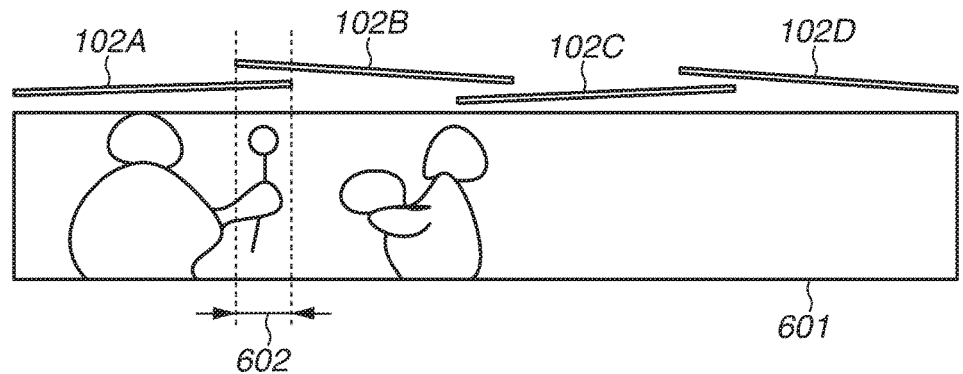
FIGS. 6A to 6C illustrate a technique for positioning image data in horizontal and vertical directions.
Figure 6B:
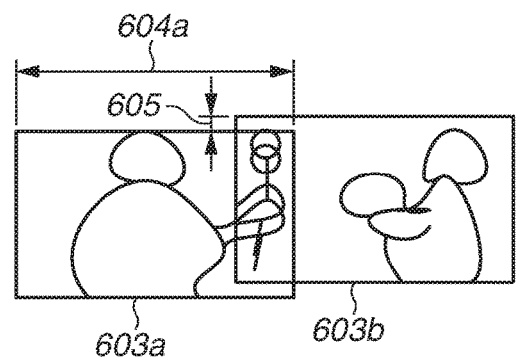
Figure 6C:
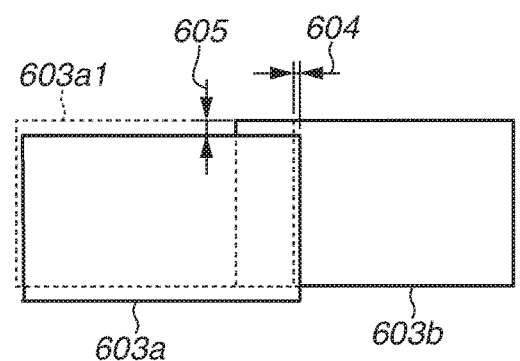

FIGS. 6A to 6C illustrate an example of a detection method for detecting the displacement other than the skew angle of the document and the assembling angle of the sensor device. The displacement can be corrected based on the detected displacement. It is assumed that correction of the document image in the rotation direction (correction using the document skew angle and the assembling angle of the sensor device) is completed before a state reaches as illustrated in FIGS. 6A to 6C.

Regarding the detection and correction of the displacement in the main scanning direction and the sub-scanning direction of the sensor device itself, a method for arranging the sensor devices by overlapping with each other and the like is used so as to read the same area overlappingly. The sensor devices are arranged by overlapping with each other to read the same area overlappingly, and portions reading the same area are compared with each other, so that the positional relationship with each sensor device can be obtained. According to the present exemplary embodiment, the displacement is corrected after correcting the assembling angle of the sensor device which is an issue especially in the large-sized scanner.

FIG. 6A illustrates the four sensor devices 102A, 102B, 102C and 102D in the image processing apparatus 100 according to the present exemplary embodiment. The image processing apparatus 100 configures the large-sized scanner. The four sensor devices 102A to 102D are each arranged at different assembling angles. Further, the four sensor devices 102A to 102D are each arranged to overlap with the adjacent sensor device in the main scanning direction. In FIG. 6A, the leftmost sensor device 102A overlaps with the next sensor device 102A in the main scanning direction, and accordingly, an overlap area 602 is formed between the sensor device 102A and the sensor device 102B. In this regard, an overlap area between the sensor devices 102B and 102C and an overlap area between the sensor devices 102C and 102D in FIG. 6A are omitted from the illustration. The sensor devices 102A to 102D thus arranged read a document 601.

FIG. 6B illustrates a read image 603a and a read image 603b which are images respectively read by the overlapping sensor devices 102A and 102B. As it is clear from FIG. 6B, an image of the overlap area 602 read by the sensor device 102A appears on a right end of the read image 603a and an image of the overlap area 602 read by the sensor device 102A appears on a left end of the read image 603b. An arrow 604a in FIG. 6B indicates a position where the read image 603a is originally placed in the horizontal direction (right and left directions). A code 605 indicates a shift of the read image 603a in the vertical direction (upper and lower directions) with respect to the read image 603b.

According to the present exemplary embodiment, the read image 603a is slightly shifted in the right direction and in the lower direction with respect to the read image 603b. In order to correct the shift, the read image 603a is moved toward the left direction and the upper direction to the read image 603b so that a correlation between the image of the read image 603a in the overlap area 602 and the image of the read image 603b in the overlap area 602 becomes the highest.

FIG. 6C illustrates a horizontal direction movement amount 604 and a vertical direction movement amount 605 of the read image 603a when the correlation between the image of the read image 603a in the overlap area 602 and the image of the read image 603b in the overlap area 602 becomes the highest. A position of the read image 603a at which the correlation is the highest is indicated by a dashed line 603a1. The horizontal direction movement amount 604 and the vertical direction movement amount 605 are the relative position of the sensor devices 102A and 102B. In FIG. 6C, outer frames of the read images are only indicated for convenience of illustration.

The technique can be applied to an arbitrary image, however, when the overlap area 602 includes a pattern which is repeated in a short period in either or both of the main scanning direction (the horizontal direction) and the sub-scanning direction (the vertical direction), the correlation becomes the highest at a false position. Therefore, a correct position is calculated by reading a calibration image and the like in many cases.

For the calibration image in such a case, for example, a single diagonal line 504 as illustrated in FIG. 5A is used. The diagonal line 504 is arranged on the calibration sheet together with the dots 501 for obtaining the rotation angle as illustrated in FIG. 5A, and thus the shifts in the horizontal direction and the vertical direction of the respective sensor devices 102A to 102D can be obtained. When the relative positional relationships in the horizontal direction and the vertical direction of the respective sensor devices are confirmed by the above-described method, absolute positions of all the sensor devices 102A to 102D can be understood by managing only the origin of the sensor device 102A which is arranged on the leftmost end.

Figure 7:
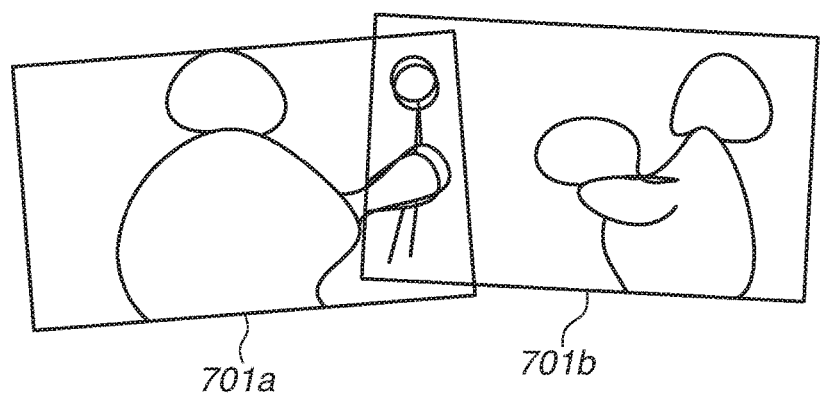
FIG. 7 illustrates a conventional technique for positioning image data in horizontal and vertical directions.

Conventionally, when the overlap area of the sensor devices with each other is determined, the assembling angles which are different for the respective sensor devices are not considered. Thus, when a correlation is tried to be obtained by moving read images 701a and 701b which are read in a rotated and distorted state as illustrated in FIG. 7 in the horizontal direction and the vertical direction, images in the overlap area cannot perfectly coincide with each other in some cases. Therefore, the accuracy of the position detection is low in the horizontal direction and the vertical direction.

In contrast, according to the present exemplary embodiment, correction is performed by taking the assembling angles different for the respective sensor devices into consideration. More specifically, the correction in the rotation direction (correction using the skew angle of the document and the assembling angle of the sensor device) is first performed on the read images 701a and 701b including the assembling angle distortion of the sensor devices as in FIG. 7. When the correction of the skew angle of the document and the assembling angle of the sensor device is performed, the read images 701a and 701b can be straightly faced to each other as with the read images 603a and 603b in FIG. 6B. The above-described correction in the rotation direction is performed, and then the shifts of the read images 603a (701a) and 603b (701b) in the horizontal direction and the vertical direction are detected. Thus, detection accuracy in the arrangement of the sensor device can be improved as a result. As described above, according to the present exemplary embodiment, the correction of the document image data is performed in the horizontal direction and the vertical direction after the correction of the document image data is performed in the rotation direction. The correction is performed by the image processing hardware module 103.

According to the first exemplary embodiment, the image processing apparatus 100 constituted of a plurality of the sensor devices 102A to 102D assembled thereto can easily calculate the correction coefficients (the equation 2) enabling correct image reading even if assembling accuracy of the sensor devices 102A to 102D is low. Thus, a check of the image processing apparatus (or a device including the image processing apparatus) at factory shipment and maintaining accuracy of the image processing apparatus in actual use at a shipment destination can be easily performed.

By once passing the calibration sheet 500 on which a predetermined pattern is printed there through while allowing a certain degree of skew, the image processing apparatus can calculate a skew angle of the calibration sheet and the respective assembling angles of the sensor devices 102A to 102D. Thus, a detection operation for correcting the image processing apparatus 100 in operation (in a practical use) after installation of the image processing apparatus can be simplified. In addition, a calibration operation time at the time of shipment from the factory can be significantly shortened.

Further, the present exemplary embodiment can be applied to a case in which a large-sized image is read by gathering a plurality of individual handy scanners and the like which are not configured as the large-sized scanner and to an image processing apparatus which is configured to be able to extend a reading width as the large-sized scanner. In other words, when a plurality of feature points to be reference is arranged in a read image, and an original coordinate position thereof can be stored in advance, an assembling angle of each scanner and a skew angle of a document itself can be uniquely detected and corrected.

In this regard, when a printed feature point is added to a head of a read document, the assembling angle correction and image skew correction can be executed by passing the sheet once in the reading of the document. Thus, deterioration of the read image caused by distortion of the sensor device and the like can be corrected.

The image processing apparatus according to the present exemplary embodiment is described as the large-sized scanner, however a size of a document to be read is not limited to, for example, a document exceeding an A3 size. As long as the image processing apparatus includes a plurality of the sensor devices, a size of a document is not limited. In addition, the extraction number of the feature points is not limited to 100 or more.

The configuration of the image processing apparatus 100 according to the first exemplary embodiment is not limited to the above-described one. For example, the number of the sensor devices 102 is not limited to four. For example, the number of the sensor devices 102 may be one.

Figure 8:
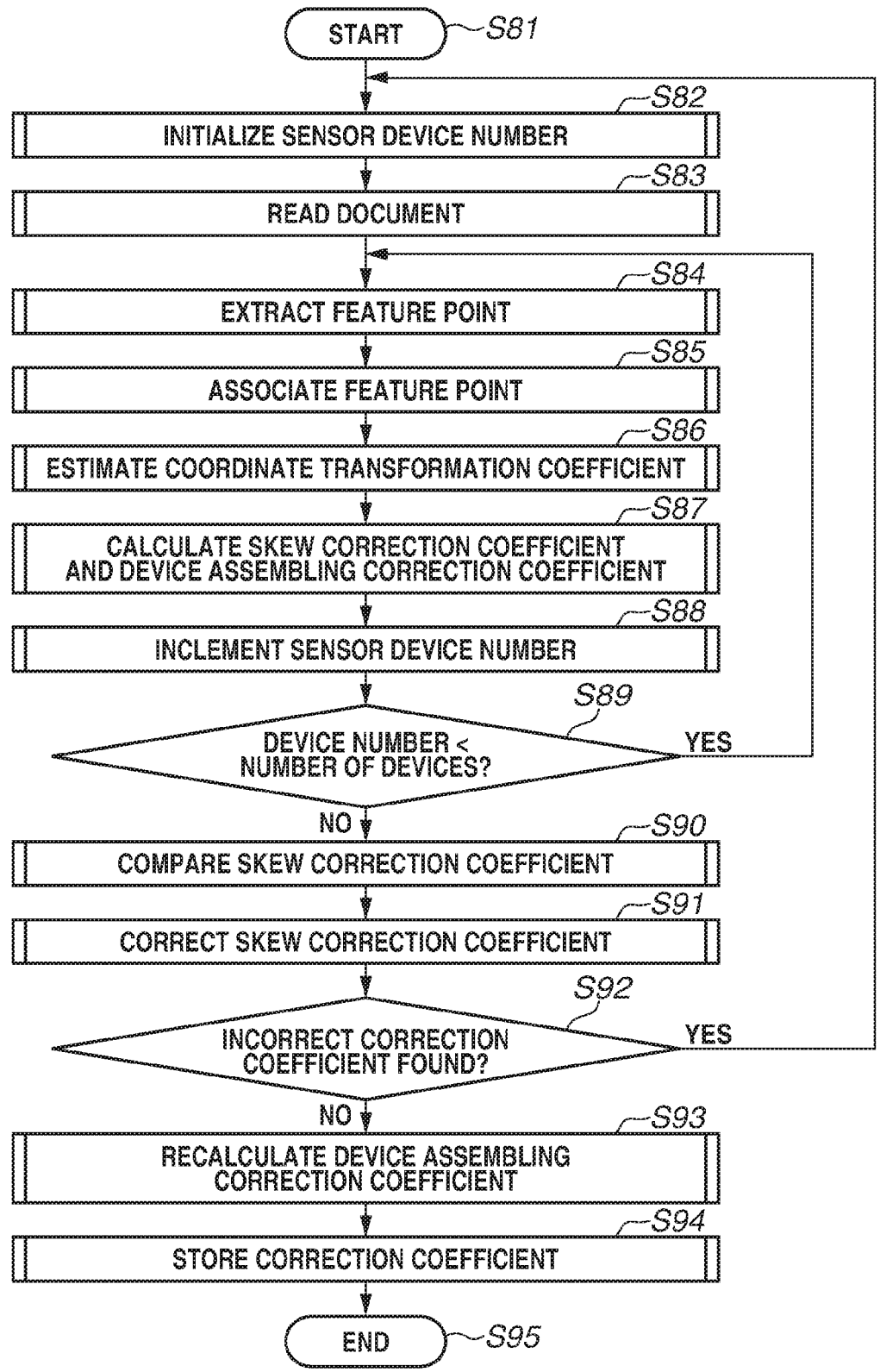
FIG. 8 illustrates procedures of correction coefficient calculation processing according to a second exemplary embodiment.

Aspects of the present invention are not limited to the above-described exemplary embodiment. For example, the procedure of the correction coefficient calculation is not limited to that illustrated in FIG. 4, and correction coefficient calculation processing illustrated in FIG. 8 may be adopted. A case when the correction coefficient calculation processing in FIG. 8 is adopted is described below as a second exemplary embodiment. An image processing apparatus used in the second exemplary embodiment is the same as the image processing apparatus 100 according to the first exemplary embodiment. The image processing apparatus 100 includes the four sensor devices 102A to 102D, so that the number of the sensor devices is four. According to the first exemplary embodiment, the skew correction coefficients a and b of the sensor device are used as the skew correction coefficients of all the sensor devices 102A to 102D on the premise that a sheet has no distortion, deflection, and the like. In other words, it is on the premise that when the sheet has no distortion, deflection, and the like, the skew correction coefficients of all the sensor devices 102A to 102D are the same, and it is enough to obtain only the skew correction coefficients of the sensor device 102A. According to the second exemplary embodiment, it is assumed that a sheet has distortion, deflection, and the like. When the sheet has distortion, deflection, and the like, there is a possibility that the skew correction coefficients of all the sensor devices 102A to 102D are not the same. According to the second exemplary embodiment, the skew correction coefficients a and b of the sensor device are calculated and determined by considering such distortion, deflection, and the like of the sheet.

A method for calculating the correction coefficients according to the second exemplary embodiment is described with reference to FIG. 8.

In step S81, the image processing hardware module 103 starts the processing. In step S82, the image processing hardware module 103 initializes the sensor device number to zero.

In step S83, the sensor devices 102A to 102D read a document. In step S84, the image processing hardware module 103 extracts a plurality of feature points from the image read by the first sensor device 102A. The sensor device number of the first sensor device 102A is zero.

In step S85, the image processing hardware module 103 associates the position coordinates of the feature point stored in advance with the extracted feature point.

In step S86, the image processing hardware module 103 performs the statistical processing on pairs of all the extracted feature points and the stored feature points and calculates the coordinate transformation coefficients $\alpha$, $\beta$, $\gamma$, and $\delta$.

In step S87, the image processing hardware module 103 calculates the skew correction coefficients a and b and the device assembling angle correction coefficients c and d using the equation 1 and the equation 2. By the processing from steps S84 to S87, the correction coefficients regarding the first sensor device 102A can be obtained.

In step S88, the image processing hardware module 103 increments the sensor device number. The current sensor device number is zero, so that the sensor device number is incremented to one.

In step S89, the image processing hardware module 103 determines whether the sensor device number is less than the number of the sensor devices. The sensor device number is one, and the number of the sensor devices is four. Since the sensor device number is less than the number of the sensor devices (YES in step S89), the processing returns to step S84.

When the processing returns to step S84, the processing from steps S84 to S87 is performed on the image read by the second sensor device. Accordingly, the correction coefficients regarding the sensor device can be obtained.

In step S88, the sensor device number is incremented from one to two. The determination in step S89 is YES, and the processing returns to step S84. Subsequently, the processing from steps S84 to S87 is performed on the image read by the third sensor device 102C. Accordingly, the correction coefficients regarding the sensor device 102C can be obtained.

In step S88, the sensor device number is incremented from two to three. The determination in step S89 is YES, and the processing returns to step S84. Subsequently, the processing from steps S84 to S87 is performed on the image read by the fourth sensor device 102D. Accordingly, the correction coefficients regarding the sensor device 102A can be obtained.

When the correction coefficients regarding the sensor device 102A are obtained, in step S88, the sensor device number becomes four. Thus, the determination in step S89 is NO. When the determination in step S89 is NO, the processing proceeds to step S90.

In step S90, the image processing hardware module 103 compares the skew correction coefficients a and b of all the sensor devices 102A to 102D with each other. When the sheet has no distortion, deflection, and the like, the skew angles of the document are the same in all the sensor devices 102A to 102D. Thus, when the sheet has no distortion, deflection, and the like, the skew correction coefficients a and b are the same in all the sensor devices 102A to 102D. If the sheet has distortion, deflection, and the like, the skew correction coefficients are not the same in all the sensor devices 102A to 102D.

When the skew correction coefficients a and b are not the same in all the sensor devices 102A to 102D, in step S91, the image processing hardware module 103 corrects the skew correction coefficients. The correction of the skew correction coefficient is performed, for example, using any one of the following three methods (1) to (3). (1) A method for replacing the skew correction coefficients with an average value of the skew correction coefficients calculated in all the sensor devices 102A to 102D. (2) A method for replacing the skew correction coefficients with a median value of the skew correction coefficients calculated in all the sensor devices 102A to 102D. (3) A method for replacing the skew correction coefficients with an average value of the calculated skew correction coefficients after excluding the most widely varied one. The average value and the median value calculated by the methods (1) to (3) can be referred to as a representative value. In other words, the correction of the skew correction coefficients can be performed by a determination method (an extraction method) of the above-described representative value.

In step S92, the image processing hardware module 103 determines whether an extremely incorrect skew correction coefficient is found when the representative value is determined in step S91. When the extremely incorrect skew correction coefficient is found (YES in step S92), the processing returns to step S82, and the correction coefficients are obtained again. When the extremely incorrect skew correction coefficient is not found (NO in step S92), the processing proceeds to step S93.

In step S93, the device assembling correction angle coefficients c and d are recalculated based on the skew correction coefficients subjected to comparison and correction steps (subjected to the processing in steps S90 and S91). In this regard, recalculation is performed by replacing the values of $\beta$ and $\delta$ in the equation 1 and the equation 2 with the representative value calculated in step S91, and the device assembling correction coefficients c and d are recalculated. In other words, the assembling angles of the plurality of the sensor devices are corrected using the corrected skew angle of the document image.

In step S94, the image processing hardware module 103 records (stores) the calculated correction coefficients in the first storage unit 104.

In step S95, the CPU 101 terminates the correction coefficient calculation processing.

As described above, according to the second exemplary embodiment, the skew correction coefficients a and b of the sensor device are calculated by considering the distortion, deflection, and the like of the sheet, so that the skew correction coefficients a and b can be calculated with higher accuracy. According to the second exemplary embodiment, the image processing apparatus 100 constituted of a plurality of the sensor devices 102A to 102D assembled thereto can also easily calculate the correction coefficients enabling correct image reading even if assembling accuracy of the sensor devices 102A to 102D is low.

The calculation procedure of the skew correction coefficients a and b according to the second exemplary embodiment is not limited to the order of steps illustrated in FIG. 8. For example, the order of steps S82 and S83 in FIG. 8 may be changed.

Aspects of the present invention can be also realized by supplying a storage medium storing a program code of software for realizing the functions of the above-described exemplary embodiments (for example, steps illustrated in the above-described flowcharts) to a system connected to the image processing apparatus or the image processing apparatus. In this case, the system or a computer (a CPU, a micro processing unit (MPU), and the like) of the image processing apparatus realizes the functions of the above-described exemplary embodiments by reading and executing the program code stored in a computer readable manner in the storage medium. Further, the program may be executed by a single computer or a plurality of computers interlocking with each other.

According to aspects of the present invention, a skew angle of a document image and an assembling angle of a sensor device can be obtained effectively and accurately.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While aspects of the present invention have been described with reference to exemplary embodiments, it is to be understood that aspects of the invention are not limited to the disclosed exemplary embodiments. The scope of the following claims is to be accorded the broadest interpretation so as to encompass all such modifications and equivalent structures and functions.

This application claims the benefit of Japanese Patent Application No. 2015-184524, filed Sep. 17, 2015, which is hereby incorporated by reference herein in its entirety.

What is claimed is:

1. An image processing apparatus comprising:
an image obtaining unit including a plurality of image obtainment devices and configured to obtain image data of a document image;
an extraction unit configured to extract a plurality of feature points of the document image;
an association unit configured to associate coordinates of a plurality of feature points of a registered document image registered in advance with coordinates of the plurality of extracted feature points of the document image;
a correspondence relationship obtaining unit configured to obtain a coordinate correspondence relationship between the coordinates of the plurality of feature points of the registered document image and the coordinates of the plurality of feature points of the obtained document image which are associated with each other; and
an angle obtaining unit configured to obtain a skew angle of the document image with respect to a predetermined direction and an assembling angle of the image obtaining unit with respect to a predetermined assembling direction using the obtained coordinate correspondence relationship,
wherein the coordinate correspondence relationship is a coordinate transformation coefficient, and
the correspondence relationship obtaining unit separately obtains a coordinate transformation coefficient regarding the skew angle of the document image and a coordinate transformation coefficient regarding the assembling angle of the image obtaining unit.

2. The image processing apparatus according to claim 1, wherein the correspondence relationship obtaining unit performs statistical processing on the coordinates of the plurality of feature points of the registered document image and the coordinates of the plurality of feature points of the document image and obtains the coordinate correspondence relationship based on a result of the statistical processing.

3. The image processing apparatus according to claim 1, wherein the angle obtaining unit obtains a correction coefficient for obtaining the skew angle of the document image with respect to each of the plurality of image obtainment devices using the coordinate transformation coefficient, compares the correction coefficient with each other, and corrects each correction coefficient based on a result of the comparison.

4. The image processing apparatus according to claim 3, wherein the angle obtaining unit corrects an assembling angle of each of the plurality of image obtainment devices using the corrected correction coefficient.

5. The image processing apparatus according to claim 1, further comprising:
a unit configured to perform correction in a rotation direction of the image data based on the skew angle of the document image and the assembling angle of the image obtaining unit; and
a unit configured to perform position correction of the image data in a horizontal direction and a vertical direction after performing correction in the rotation direction.

6. The image processing apparatus according to claim 1, wherein the angle obtaining unit obtains the skew angle of the document image and the assembling angle of the image obtaining unit at the same time.

7. The image processing apparatus according to claim 1, wherein the image obtaining unit obtains the image data from a calibration sheet including a dot pattern arranged in a grid and a diagonal line.

8. A method for processing an image, the method comprising:
obtaining image data of a document image by an image obtaining unit by an image obtaining unit including a plurality of image obtainment devices;
extracting a plurality of feature points of the document image;
associating coordinates of a plurality of feature points of a registered document image registered in advance with coordinates of the plurality of extracted feature points of the obtained document image;
obtaining a coordinate correspondence relationship between the coordinates of the plurality of feature points of the registered document image and the coordinates of the plurality of feature points of the document image which are associated with each other; and
obtaining a skew angle of the document image with respect to a predetermined direction and an assembling angle of the image obtaining unit with respect to a predetermined assembling direction using the obtained coordinate correspondence relationship,
wherein the coordinate correspondence relationship is a coordinate transformation coefficient, and
the obtaining separately obtains a coordinate transformation coefficient regarding the skew angle of the document image and a coordinate transformation coefficient regarding the assembling angle of the image obtaining unit,
wherein the coordinate correspondence relationship is a coordinate transformation coefficient, and
the obtaining separately obtains a coordinate transformation coefficient regarding the skew angle of the document image and a coordinate transformation coefficient regarding the assembling angle of the image obtaining unit,
wherein the coordinate correspondence relationship is a coordinate transformation coefficient, and
the obtaining separately obtains a coordinate transformation coefficient regarding the skew angle of the document image and a coordinate transformation coefficient regarding the assembling angle of the image obtaining unit.

9. The method according to claim 8, wherein the obtaining the coordinate correspondence relationship performs statistical processing on the coordinates of the plurality of feature points of the registered document image and the coordinates of the plurality of feature points of the document image and obtains the coordinate correspondence relationship based on a result of the statistical processing.

10. The method according to claim 8, further comprising:
performing correction in a rotation direction of the image data based on the skew angle of the document image and the assembling angle of the image obtaining unit; and
performing position correction of the image data in a horizontal direction and a vertical direction after performing correction in the rotation direction.

11. The method according to claim 8, wherein the obtaining obtains the skew angle of the document image and the assembling angle of the image obtaining unit at the same time.

12. The method according to claim 8, wherein the obtaining obtains the image data from a calibration sheet including a dot pattern arranged in a grid and a diagonal line.

13. A computer readable non-transitory storage medium storing a program comprising:
obtaining image data of a document image by an image obtaining unit including a plurality of image obtainment devices;
extracting a plurality of feature points of the document image;
associating coordinates of a plurality of feature points of a registered document image registered in advance with coordinates of the plurality of extracted feature points of the document image;
obtaining a coordinate correspondence relationship between the coordinates of the plurality of feature points of the registered document image and the coordinates of the plurality of feature points of the document image which are associated with each other; and
obtaining a skew angle of the document image with respect to a predetermined direction and an assembling angle of an image obtaining unit with respect to a predetermined assembling direction using the obtained coordinate correspondence relationship,
wherein the coordinate correspondence relationship is a coordinate transformation coefficient, and
the obtaining separately obtains a coordinate transformation coefficient regarding the skew angle of the document image and a coordinate transformation coefficient regarding the assembling angle of the image obtaining unit.

14. The computer readable non-transitory storage medium according to claim 13, wherein the obtaining the coordinate correspondence relationship performs statistical processing on the coordinates of the plurality of feature points of the registered document image and the coordinates of the plurality of feature points of the document image and obtains the coordinate correspondence relationship based on a result of the statistical processing.

15. The computer readable non-transitory storage medium according to claim 13, further comprising:
performing correction in a rotation direction of the image data based on the skew angle of the document image and the assembling angle of the image obtaining unit; and
performing position correction of the image data in a horizontal direction and a vertical direction after performing correction in the rotation direction.

16. The computer readable non-transitory storage medium according to claim 13, wherein the obtaining obtains the skew angle of the document image and the assembling angle of the image obtaining unit at the same time.

17. The computer readable non-transitory storage medium according to claim 13, wherein the obtaining obtains the image data from a calibration sheet including a dot pattern arranged in a grid and a diagonal line.

* * * * *